US008785778B2

(12) United States Patent
Streeter et al.

(10) Patent No.: US 8,785,778 B2

(45) Date of Patent: Jul. 22, 2014

(54) PALS COMPLIANT ROUTING SYSTEM

(75) Inventors: Richard Streeter, Andover, MA (US); Brian Farrell, Quincy, MA (US)

(73) Assignee: Foster-Miller, Inc., Waltham, MA (US)

( * ) Notice: Subject to any disclaimer, the term of this patent is extended or adjusted under 35 U.S.C. 154(b) by 295 days.

(21) Appl. No.: 13/199,223

(22) Filed: Aug. 23, 2011

(65) Prior Publication Data

US 2012/0045929 A1 Feb. 23, 2012

Related U.S. Application Data

(60) Provisional application No. 61/402,047, filed on Aug. 23, 2010.

(51) Int. Cl.
*H02G 3/04* (2006.01)

(52) U.S. Cl.
USPC ........................................ 174/72 A; 439/719

(58) Field of Classification Search
USPC ........................ 174/72 A; 439/719, 492, 527
See application file for complete search history.

(56) References Cited

U.S. PATENT DOCUMENTS

| | | | | |
|---|---|---|---|---|
| 5,724,707 | A | 3/1998 | Kirk et al. | |
| 6,727,197 | B1 * | 4/2004 | Wilson et al. | 442/301 |
| 7,708,581 | B2 * | 5/2010 | Weiss | 439/344 |
| 2007/0173111 | A1 * | 7/2007 | Elliot et al. | 439/535 |
| 2008/0160826 | A1 * | 7/2008 | Lamoureux et al. | 439/535 |
| 2010/0025560 | A1 * | 2/2010 | Beck | 248/558 |

OTHER PUBLICATIONS

International Searching Authority, Written Opinion for International Application No. PCT/US/2011/001476, 6 pages (unnumbered).

* cited by examiner

*Primary Examiner* — Dhirubhai R Patel

(74) *Attorney, Agent, or Firm* — Iandiorio Teska & Coleman, LLP

(57) ABSTRACT

A PALS compliant routing system includes flexible fabric cabling routed through the webbing of a PALS grid. A first connector or device is coupled to the cabling. Other connectors coupled to the cabling subsystem include a retention mechanism configured to retain them in the channels of the PALS webbing.

21 Claims, 7 Drawing Sheets

PALS COMPLIANT ROUTING SYSTEM

RELATED APPLICATIONS

This application claims benefit of and priority to U.S. Provisional Application Ser. No. 61/402,047 filed Aug. 23, 2010 under 35 U.S.C. §§119, 120, 363, 365, and 37 C.F.R. §1.55 §1.78, which is incorporated herein by this reference.

FIELD OF THE INVENTION

The subject invention relates a flexible cabling and connector subsystem.

BACKGROUND OF THE INVENTION

Modern military personnel carry and/or use electronic equipment such as handheld controllers and computers coupled via cabling to other electronic devices such as a mouse, heads up display, a keypad, and the like. The cabling is often unwieldy and can interfere with operations. Civilians often face the same problem.

BRIEF SUMMARY OF THE INVENTION

Military and some civilian articles such as pouches and vests include the Pouch Attachment Ladder (PAL) system of woven webbing, typically horizontal rows of 1" webbing spaced 1" apart and attached to a backing at 1.5" intervals forming channels. See U.S. Pat. No. 5,724,707 incorporated herein by this reference.

In this invention, a flexible cabling system includes a connector or connectors with a retention mechanism configured to retain each connector neatly in a channel of the PALS webbing.

A Pouch Attachment and Ladder System (PALS) compliant routing system includes a flexible cabling subsystem routed through the webbing of a PALS grid and having a first connector or device coupled to the cabling subsystem. At least a second connector is coupled to the cabling subsystem and includes a retention mechanism configured to retain the second connector in a channel of the PALS webbing.

Typically, the cabling subsystem includes a flat textile cable. In one version, the retention mechanism includes at least one lip on the connector. In another version, there are spaced lips, one for each end of the channel. In still another version, the retention mechanism includes a clip or a tab.

In some embodiments, the retention mechanism is associated with a housing receiving the second connector therein.

In one version, there is a first connector coupled to a hub and multiple connectors coupled to the hub each including a retention mechanism configured to retain the second connectors in different channels of the PALS webbing. The hub may include a retention mechanism configured to retain the hub with respect to a channel of the PALS webbing.

Featured is a PALS compliant electrical signal routing system comprising a plurality of flat, flexible, fabric electrical signal cables configured to be routed through the channels of the webbing of a PALS grid, and connectors for the cables configured to be fitted in the channels. Each connector includes a retention mechanism retaining it in a different said channel. A retention mechanism can be on a connector housing. The system can also include a hub for the cables.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
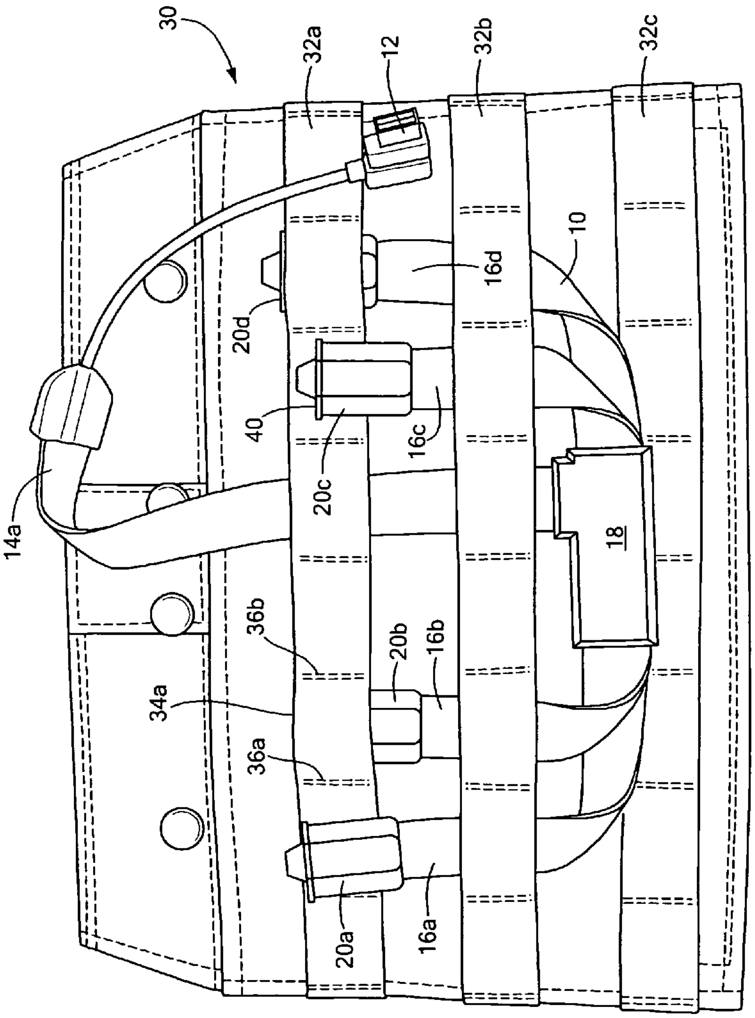
FIG. 1 is a schematic front view showing an example of a PALS compliant routing system in accordance with the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 depicts flexible cabling subsystem 10 including, in this example, USB male connector 12 coupled to flat textile electrical cable 14*a* itself connected to electrical flat textile cables 16*a*, 16*b*, 16*c*, and 16*d* via hub 18. Female USB connectors 20*a*-20*d* are electrically and physically coupled to flat textile cables 16*a*-16*d*, respectively, and thus to hub 18 and male connector 12. In this way, connector 12 can be plugged into an electronic device such as a portable computer and peripheral devices can be plugged into connectors 20*a*-20*d*. Alternatively, cable 14*a* can be hard wired to an electronic device in which case connector 12 would not be used.

FIG. 1 also shows pouch 30 with a PALS grid including webbing 32*a*, 32*b*, and 32*c* each including multiple channels. Channel 34*a*, for example, is defined by stitching 36*a* and 36*b*. Connectors 20*a*-20*d* are removeably retained in the channels of the PALS grid and cabling 14*a* and 16*a*-16*d* is routed through the webbing of the PALS grid as shown.

Each specially configured connector 20*a*-20*d* includes a retention mechanism designed to retain the connector in a channel of the PALS webbing. In this example, the retention mechanism includes a lip on the connector as shown at 40 for connector 20*c*. As shown for connector 20*d*, the top lip prevents connector 20*d* from sliding downward in the channel of the PALS webbing grid. The result is cabling and connectors which do not interfere with the operations and maneuvers of the user.

Figure 2:
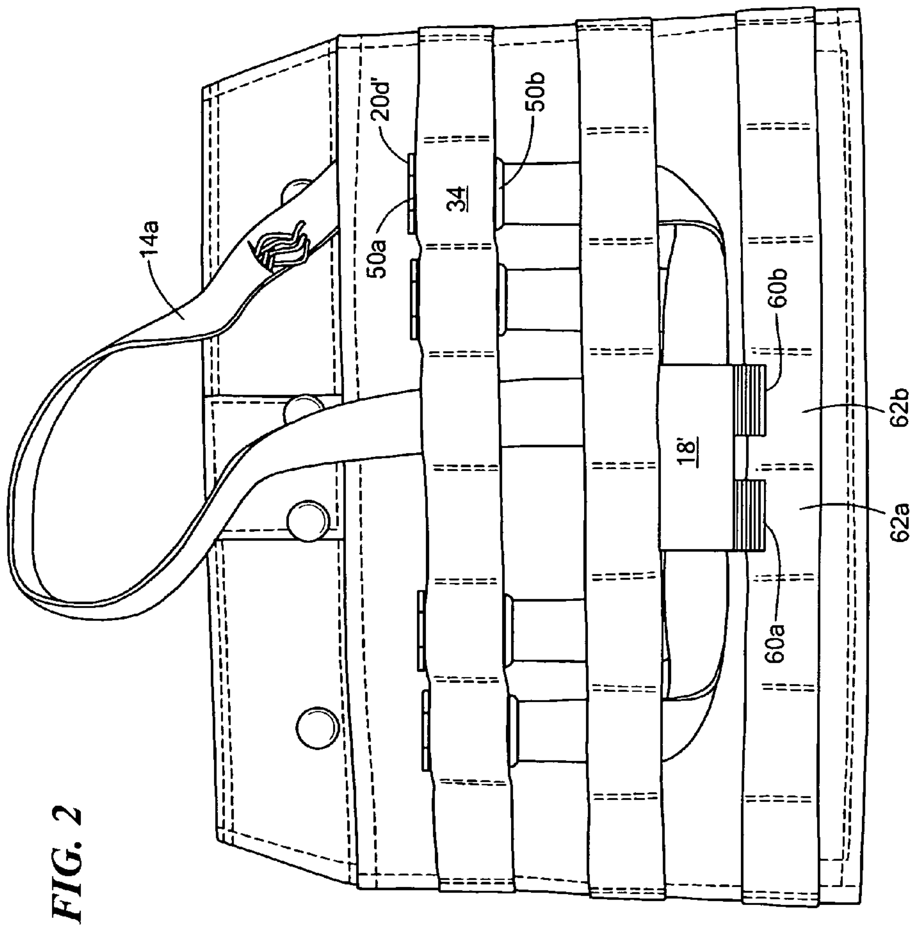
FIG. 2 is a schematic front view showing another example of a PALS compliant routing system in accordance with the invention.
Figure 3:
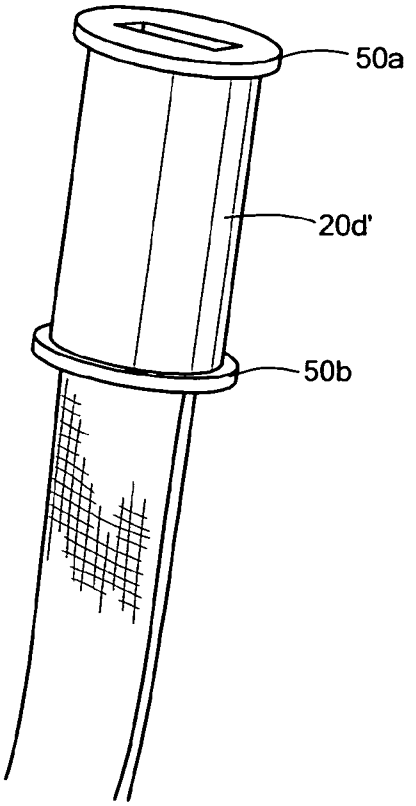
FIG. 3 is a close up view of one of the connectors shown in FIG. 2.

FIG. 2 shows another design where each connector, as shown for connector 20*d*', includes top and bottom lips 50*a* and 50*b* spaced approximately 1" apart to retain connector 20*d*' in channel 24 and prevent connector 20*d*' from slipping up or down in the channel. Cable 14*a* is ready to be attached to a connector or hardwired to an electronic device. Also, in this design, hub 18' includes downwardly depending tab 60*a* and 60*b* which are received in channels 62*a* and 62*b*, respectively. Such tabs could also be associated with the connectors. FIG. 3 also shows connector 20*d*', FIG. 2.

Figure 4:
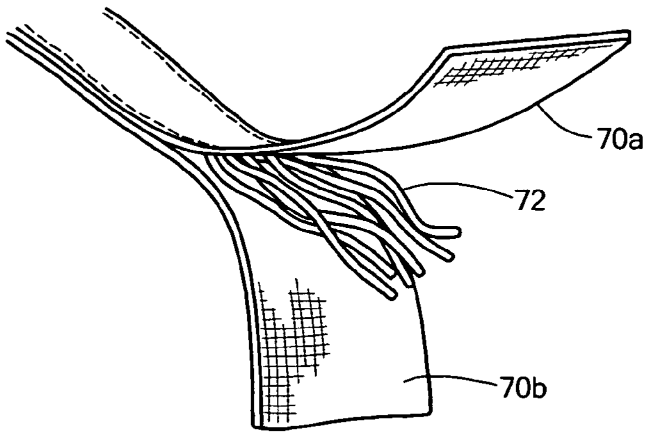
FIG. 4 is a schematic view showing a portion of the cabling shown in FIG. 2.

FIG. 4 shows a portion of the flexible cabling which may be used in accordance with the invention including stitched together fabric webbing portions 70*a* and 70*b* sandwiching electrical wires 72 therebetween. E-textiles may also be used including the design shown in U.S. Pat. No. 6,727,197 incorporated herein by this reference where electrical conductors are woven into a fabric strap.

Figure 5:
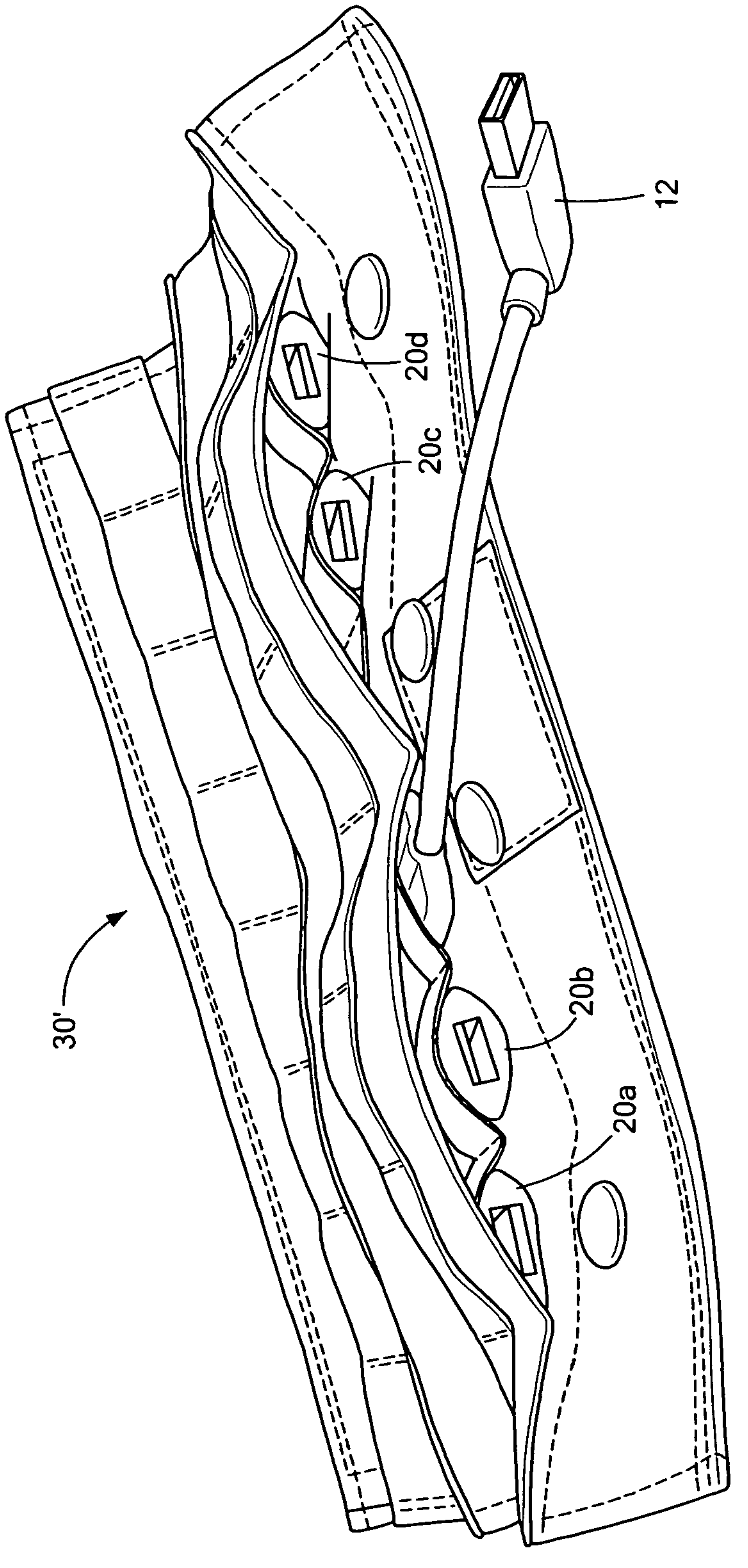
FIG. 5 is a schematic view showing another example of a PALS compliant cabling/connector system in accordance with the invention where the cabling subsystem is disposed inside a military pouch.
Figure 6:
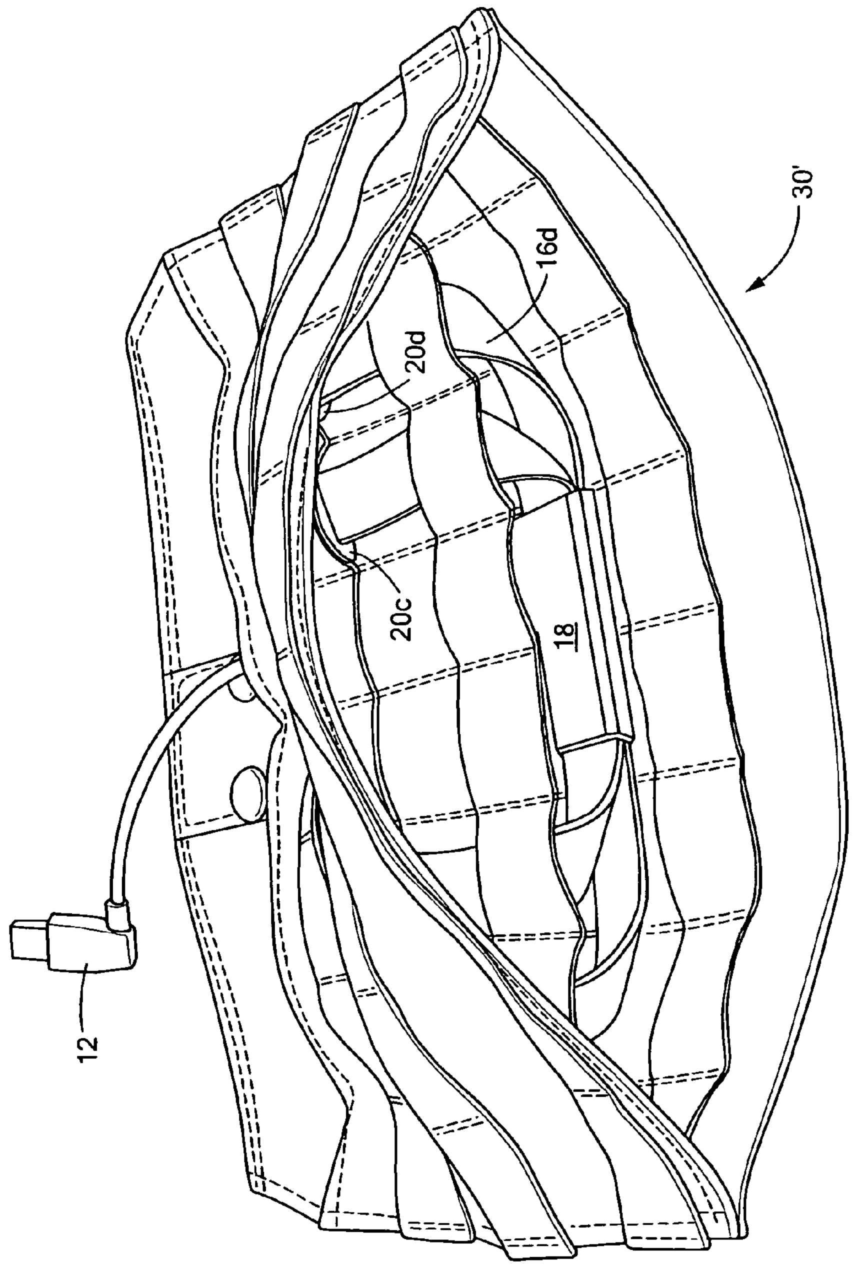
FIG. 6 is another schematic view showing the pouch of FIG. 5.

FIGS. 5-6 depict a configuration where the cabling subsystem shown in FIG. 1 is disposed inside MOLLE pouch 30' configured to include internal PAL webbing. Connectors 20*a*-20*d* can be seen as can connector 12.

Figure 7:
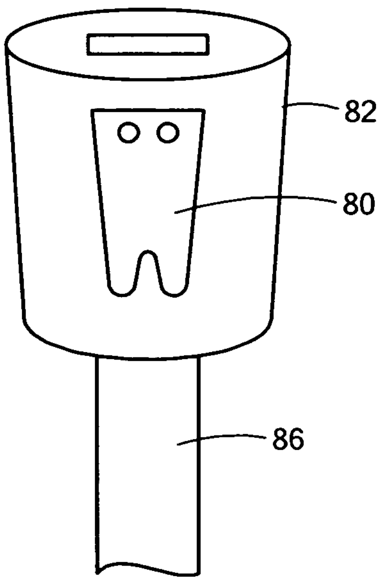
FIG. 7 is a schematic three-dimensional front view showing another example of a connector retention mechanism in accordance with the invention.
Figure 8:
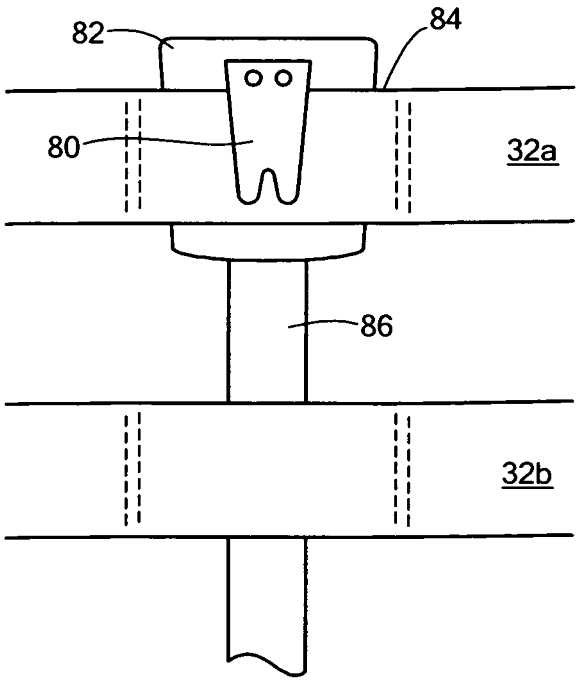
FIG. 8 is a schematic front view showing the connector of FIG. 7 disposed in a channel of a PALS webbing structure.

FIGS. 7-8 depict another design of a connector retention mechanism in the form of clip 80 coupled to connector 82. Connector 82, FIG. 8 is disposed in channel 84 with clip 80 retaining connector 82 therein as shown. Cabling 86 is routed through the webbing of the PALS grid as discussed above. Other retention mechanisms are within the scope of the subject invention.

Figure 9A:
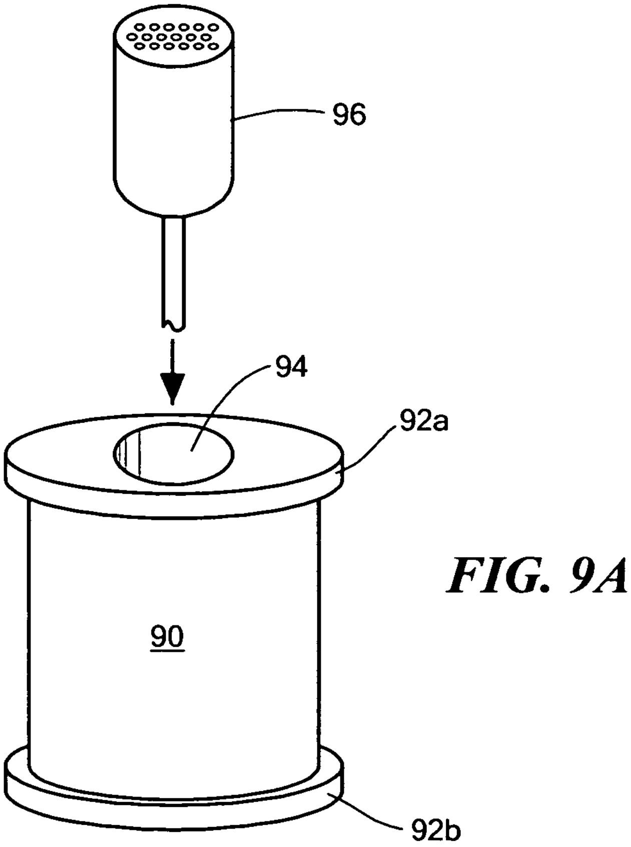
FIGS. 9A-9B are schematic front views depicting a PALS compliant connector housing in accordance with the invention.
Figure 9B:
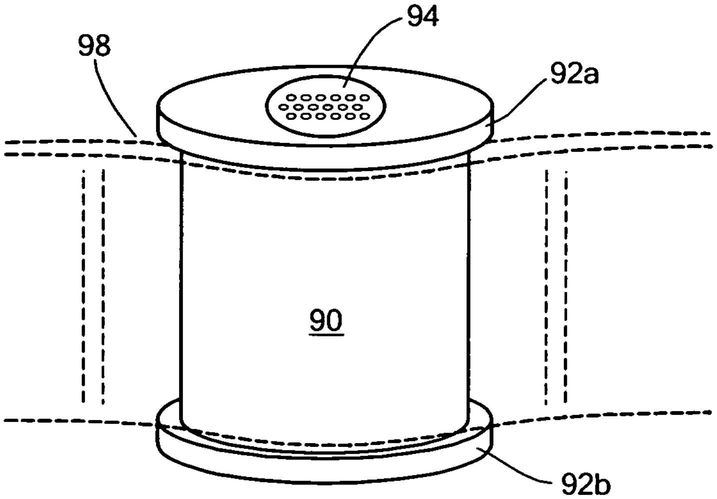

Moreover, a connector need not be specially designed to include a channel retention mechanism. In the design shown in FIGS. 9A-9B, for example, housing 90 includes lips 92*a* and 92*b* and cavity 94 for retaining a commercial or military standard connector 96 therein and, as shown, housing 90 includes a PALS webbing retention mechanism for retaining connector 96 within housing 90 in channel 98, FIG. 9B.

Whether the connector itself or its housing has a retention mechanism, it is desirable that the connector or housing has a profile so that it neatly fits in a standard PAL channel as shown for connector 20*d*, FIG. 1. Thus, the preferred connector or housing is typically approximately 1" tall and 1" to 1.5" wide and has a flattened oval shape (if possible). Cabling 14*a*, 16*a*-16*d*, and the like preferably also fits neatly through the PAL channels and is preferably less than 1.5" wide and generally flat in construction. It is also preferable that the connectors be fairly easy to insert into their respective PAL channels and also fairly easy to remove them therefrom. In this way, a soldier, for example, can configure a MOLLE pouch as shown in FIG. 1 but then later, on another mission where the MOLLE pouch is not used, the soldier may still use the cabling subsystem shown with other MOLLE articles.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A Pouch Attachment and Ladder Systems (PALS) PALS compliant routing system comprising:
- a flexible cabling subsystem routed through webbing of a PALS grid and having a first connector or device coupled to the cabling subsystem;
- at least a second connector coupled to the cabling subsystem; and
- a retention mechanism associated with the second connector and configured to retain the second connector in a channel of the PALS webbing.

2. The system of claim 1 in which the cabling subsystem includes a flat textile cable.

3. The system of claim 1 in which the retention mechanism includes at least one lip for the second connector.

4. The system of claim 3 in which there are spaced lips, one for each end of the channel.

5. The system of claim 1 in which the retention mechanism includes a clip.

6. The system of claim 1 in which the retention mechanism includes a tab.

7. The system of claim 1 in which the retention mechanism is on a housing receiving the second connector therein.

8. The system of claim 1 in which there is a first connector coupled to a hub and multiple second connectors coupled to the hub each having a retention mechanism configured to retain the second connectors in different channels of the PALS webbing.

9. The system of claim 8 in which the hub includes a retention mechanism configured to retain the hub with respect to a channel of the PALS webbing.

10. The system of claim 1 in which the flexible cabling subsystem includes flat cabling less than 1.5 inches wide.

11. The system of claim 1 in which the second connector is between 1 and 1.5 inches wide and approximately 1 inch tall.

12. A PALS compliant electrical signal routing system comprising:
- a plurality of flat, flexible, fabric electrical signal cables configured to be routed through channels of webbing of a PALS grid;
- connectors for said cables configured to be fitted in said channels; and
- each of said connectors including a retention mechanism retaining a connector in one of said channels.

13. The system of claim 12 in which a retention mechanism includes at least one lip.

14. The system of claim 13 in which there are spaced lips, one for each end of a channel.

15. The system of claim 12 in which a retention mechanism includes a clip.

16. The system of claim 12 in which a retention mechanism includes a tab.

17. The system of claim 12 in which a retention mechanism is on a connector housing.

18. The system of claim 12 including a hub for the cables.

19. The system of claim 18 in which the hub includes a retention mechanism configured to retain the hub with respect to a channel of the PALS webbing.

20. The system of claim 12 in which the cables are less than 1.5 inches wide.

21. The system of claim 12 in which the connectors are between 1 and 1.5 inches wide and approximately 1 inch tall.

* * * * *